US012750362B2

(12) United States Patent
Sachdeva et al.

(10) Patent No.: US 12,750,362 B2
(45) Date of Patent: Sep. 29, 2026

(54) SECURE ELEMENT ARRAYS IN INTERNET-OF-THINGS SYSTEMS

(71) Applicant: ASSA ABLOY AB, Stockholm (SE)

(72) Inventors: Kapil Sachdeva, Round Rock, TX (US); Sylvain Jacques Prevost, Austin, TX (US); Matvey Mukha, Graz (AT)

(73) Assignee: ASSA ABLOY AB, Stockholm (SE)

( * ) Notice: Subject to any disclaimer, the term of this patent is extended or adjusted under 35 U.S.C. 154(b) by 119 days.

(21) Appl. No.: 18/250,023

(22) PCT Filed: Nov. 12, 2021

(86) PCT No.: PCT/EP2021/081512
§ 371 (c)(1),
(2) Date: Apr. 21, 2023

(87) PCT Pub. No.: WO2022/101405
PCT Pub. Date: May 19, 2022

(65) Prior Publication Data

US 2024/0015149 A1 Jan. 11, 2024

Related U.S. Application Data

(60) Provisional application No. 63/113,423, filed on Nov. 13, 2020.

(51) Int. Cl.
*H04L 9/40* (2022.01)
*G06F 21/57* (2013.01)
(Continued)

(52) U.S. Cl.
CPC .......... *H04L 63/0853* (2013.01); *G06F 21/57* (2013.01); *H04L 9/3234* (2013.01);
(Continued)

(58) Field of Classification Search
CPC . H04L 63/0853; H04L 9/3234; H04L 9/3263; H04L 63/0823; G06F 21/57; H04W 12/009
See application file for complete search history.

(56) References Cited

U.S. PATENT DOCUMENTS 9,312,922 B2 4/2016 Gimeno et al.
9,794,753 B1 10/2017 Stitt et al.
(Continued)

FOREIGN PATENT DOCUMENTS

AU 2020280017 9/2023
AU 2023219930 B2 5/2025
(Continued)

OTHER PUBLICATIONS

Urien, Pascal; "An innovative security architecture for low cost low power IoT devices based on secure elements: A four quarters security architecture," 15th IEEE Annual Consumer Communications & Networking Conference (CCNC), Las Vegas, NV, USA, Jan. 12-15, 2018, IEEE, 2 pages.*
(Continued)

*Primary Examiner* — Victor Lesniewski
(74) *Attorney, Agent, or Firm* — Schwegman Lundberg & Woessner, P.A.

(57) ABSTRACT

Systems and methods for providing secure execution of functions for edge devices include a plurality of edge devices, a controller, and an array of secure elements. The edge devices are each configured to obtain data for an application of the system. The controller is connected to communicate with the edge devices to receive the data from each of the edge devices. The array of secure elements is connected to the controller, and each secure element executes functions using the data received from the edge devices. The controller associates an identified secure element of the array of secure elements with a respective edge
(Continued)

device to execute the functions for data received from the respective edge device, and the controller is connected to communicate a result of the executed functions to the respective edge device.

14 Claims, 8 Drawing Sheets

(51) Int. Cl.
*H04L 9/32* (2006.01)
*H04W 12/00* (2021.01)

(52) U.S. Cl.
CPC ........ *H04L 9/3263* (2013.01); *H04L 63/0823* (2013.01); *H04W 12/009* (2019.01)

(56) References Cited

U.S. PATENT DOCUMENTS

| | | | |
|---|---|---|---|
| 10,032,171 | B2 | 7/2018 | Yeager |
| 10,185,921 | B1 | 1/2019 | Heller et al. |
| 12,022,288 | B2 | 6/2024 | Pirch et al. |
| 12,254,732 | B2 | 3/2025 | Prevost et al. |
| 2006/0224901 | A1* | 10/2006 | Lowe .................. H04L 63/0492 713/153 |
| 2010/0201536 | A1 | 8/2010 | Robertson et al. |
| 2010/0299401 | A1 | 11/2010 | Lloyd |
| 2014/0282929 | A1 | 9/2014 | Tse |
| 2015/0028996 | A1 | 1/2015 | Agrafioti et al. |
| 2015/0222517 | A1* | 8/2015 | McLaughlin ........... H04L 67/02 713/171 |
| 2015/0229654 | A1* | 8/2015 | Perier ................... H04W 12/03 726/3 |
| 2016/0006699 | A1* | 1/2016 | Taveau .................... H04L 67/10 726/3 |
| 2017/0032601 | A1 | 2/2017 | Zhou et al. |
| 2017/0134122 | A1 | 5/2017 | Noda |
| 2018/0061155 | A1 | 3/2018 | Ghorpade et al. |
| 2018/0089916 | A1 | 3/2018 | Drako et al. |
| 2018/0139569 | A1 | 5/2018 | Padgett et al. |
| 2018/0203985 | A1 | 7/2018 | Lowe |
| 2018/0315262 | A1 | 11/2018 | Love et al. |
| 2018/0351941 | A1* | 12/2018 | Chhabra ................. H04L 63/08 |
| 2019/0132136 | A1* | 5/2019 | Scarlata ................ H04L 9/0844 |
| 2019/0147676 | A1 | 5/2019 | Madzhunkov et al. |
| 2019/0258472 | A1* | 8/2019 | Kim ......................... H04B 5/20 |
| 2019/0340858 | A1 | 11/2019 | Ouellet |
| 2020/0052905 | A1* | 2/2020 | Mathias ................ H04L 9/3265 |
| 2020/0204566 | A1 | 6/2020 | Zhong et al. |
| 2020/0296093 | A1* | 9/2020 | Hoyos ................... H04L 9/3247 |
| 2020/0357269 | A1 | 11/2020 | Elhadeedy |
| 2020/0374271 | A1* | 11/2020 | Marquardt .............. G06F 21/72 |
| 2020/0382294 | A1* | 12/2020 | Pilozzi .................. H04L 9/0897 |
| 2020/0402378 | A1 | 12/2020 | Connell et al. |
| 2021/0012599 | A1 | 1/2021 | Carpenter et al. |
| 2021/0081545 | A1* | 3/2021 | Mulligan ............ G06F 9/45558 |
| 2021/0201609 | A1 | 7/2021 | Amuduri et al. |
| 2021/0350029 | A1* | 11/2021 | Plüss ....................... G06F 9/541 |
| 2022/0180351 | A1* | 6/2022 | Zhou .................. G06K 7/10297 |
| 2022/0230498 | A1* | 7/2022 | Prevost ................... H04W 4/80 |
| 2022/0392283 | A1 | 12/2022 | Charling et al. |
| 2023/0252837 | A1 | 8/2023 | Prevost et al. |
| 2024/0022389 | A1 | 1/2024 | Sachdeva et al. |

FOREIGN PATENT DOCUMENTS

| | | | |
|---|---|---|---|
| CN | 102648471 | | 8/2012 |
| CN | 106131015 | | 11/2016 |
| CN | 106059876 | | 6/2018 |
| CN | 109064599 | | 12/2018 |
| CN | 109559407 | | 4/2019 |
| CN | 110083129 | | 8/2019 |
| CN | 114679916 | | 6/2022 |
| CN | 116458123 | | 7/2023 |
| CN | 119030738 | | 11/2024 |
| EP | 2053774 | | 4/2009 |
| EP | 2437193 | | 4/2012 |
| EP | 3973685 | B1 | 2/2025 |
| EP | 4513457 | | 5/2025 |
| IN | 202117053266 | | 4/2022 |
| IN | 202317039312 | | 7/2024 |
| IN | 202518007736 | A | 3/2025 |
| JP | 2005202935 | | 7/2005 |
| JP | 2008099087 | | 4/2008 |
| JP | 2009177718 | | 8/2009 |
| JP | 2011501592 | | 1/2011 |
| JP | 2014159692 | | 9/2014 |
| JP | 2015513344 | | 5/2015 |
| JP | 2017010380 | | 1/2017 |
| JP | 2017120984 | | 7/2017 |
| JP | 2017522664 | | 8/2017 |
| JP | 2017538346 | | 12/2017 |
| JP | 6305559 | | 3/2018 |
| JP | 2019061672 | | 4/2019 |
| JP | 2019145854 | | 8/2019 |
| JP | 2022532932 | | 7/2022 |
| JP | 7274613 | | 5/2023 |
| JP | 2023062169 | | 5/2023 |
| JP | 2023549817 | | 11/2023 |
| JP | 2023180257 | | 12/2023 |
| JP | 7544885 | | 8/2024 |
| JP | 7577857 | | 10/2024 |
| JP | 2024161580 | | 11/2024 |
| JP | 2025061785 | A | 4/2025 |
| KR | 20180016235 | | 2/2018 |
| KR | 20180025903 | | 3/2018 |
| KR | 102680676 | | 6/2024 |
| WO | 2007010333 | | 1/2007 |
| WO | 2016157689 | | 10/2016 |
| WO | 2017031504 | | 2/2017 |
| WO | 2018218297 | | 12/2018 |
| WO | 2020236912 | | 11/2020 |
| WO | 2022101405 | | 5/2022 |

OTHER PUBLICATIONS

Madlmayr, Gerald; Langer, Josef; Kantner, Christian; Scharinger, Josef; Schaumuller-Bichl, Ingrid; "Risk Analysis of Over-the-Air Transactions in an NFC Ecosystem," First International Workshop on Near Field Communication, Hagenberg, Austria, Feb. 24, 2009, IEEE, pp. 87-92.*

"Synergis Cloud Link Datasheet", Genetec Inc., (2019), 2 pgs.

"International Application Serial No. PCT EP2021 081512, Invitation to Pay Additional Fees mailed Mar. 10, 2022", 11 pgs.

"International Application Serial No. PCT EP2021 081512, International Search Report mailed Jun. 14, 2022", 7 pgs.

"International Application Serial No. PCT EP2021 081512, Written Opinion mailed Jun. 14, 2022", 11 pgs.

"International Application Serial No. PCT US2020 033768, Written Opinion mailed Sep. 10, 2020", 7 pgs.

"U.S. Appl. No. 17/595,579, Preliminary Amendment filed Nov. 19, 2021", 3 pgs.

"International Application Serial No. PCT US2020 033768, International Preliminary Report on Patentability mailed Dec. 2, 2021", 9 pgs.

"Firebase Cloud Messaging", Google Firebase Documentation, [Online] Retrieved from the Internet: URL: https: web. archive.org web 20190415002940 https: firebase.google.com docs cloud-messaging , (Mar. 29, 2019), 6 pgs.

"European Application Serial No. 20731715.7, Response Filed May 4, 2022 to Communication Pursuant to Rules 161 (1) and 162 EPC filed Jan. 5, 2022", 12 pgs.

"Indian Application Serial No. 202117053266, First Examination Report mailed May 12, 2022", with English translation, 6 pages.

"Australian Application Serial No. 2020280017, First Examination Report mailed Sep. 2, 2022", 3 pgs.

"Japanese Application Serial No. 2021-569453, Notification of Reasons for Refusal mailed Nov. 29, 2022", with English translation, 10 pages.

(56) References Cited

OTHER PUBLICATIONS

"Indian Application Serial No. 202117053266, Response Filed Nov. 11, 2022 to First Examination Report mailed May 12, 2022", with English claims, 23 pages.
"Korean Application Serial No. 10-2021-7037875, Notice of Preliminary Rejection mailed Nov. 29, 2022", with English translation, 20 pages.
"Australian Application Serial No. 2020280017, Response Filed Dec. 16, 2022 to First Examination Report mailed Sep. 2, 2022", 14 pgs.
"Canadian Application Serial No. 3,138,776, Examiners Rule 86(2) Requisition mailed Jan. 31, 2023", 5 pgs.
"Australian Application Serial No. 2020280017, Subsequent Examiners Report mailed Jan. 16, 2023", 3 pgs.
"Korean Application Serial No. 10-2021-7037875, Response Filed Jan. 26, 2023 to Notice of Preliminary Rejection mailed Nov. 29, 2022", with English claims, 30 pages.
"Japanese Application Serial No. 2021-569453, Response Filed Feb. 22, 2023 to Notification of Reasons for Refusal mailed Nov. 29, 2022", with English claims, 10 pages.
"U.S. Appl. No. 17/595,579, Restriction Requirement mailed Mar. 9, 2023", 5 pgs.
"U.S. Appl. No. 17/595,579, Response filed Apr. 14, 2023 to Restriction Requirement mailed Mar. 9, 2023", 8 pgs.
"U.S. Appl. No. 18/301,427, Preliminary Amendment filed Apr. 17, 2023", 6 pgs.
"Australian Application Serial No. 2020280017, Response Filed Apr. 18, 2023 Subsequent Examiners Report mailed Jan. 16, 2023", 15 pgs.
"U.S. Appl. No. 17/595,579, Non Final Office Action mailed May 26, 2023", 11 pgs.
"International Application Serial No. PCT EP2021 081512, International Preliminary Report on Patentability mailed May 25, 2023", 13 pgs.
"Korean Application Serial No. 10-2021-7037875, Notice of Preliminary Rejection mailed May 15, 2023", with English translation, 15 pages.
"Canadian Application Serial No. 3,138,776, Response Filed May 30, 2023 to Examiners Rule 86(2) Requisition mailed Jan. 31, 2023", 11 pgs.
"Canadian Application Serial No. 3198185, Voluntary Amendment Filed Jun. 20, 2023", 9 pgs.
"Australian Application Serial No. 2021380017, Voluntary Amendment Filed Jun. 22, 2023", 16 pgs.
"Japanese Application Serial No. 2023-528465, Voluntary Amendment Filed Jun. 26, 2023", with English translation, 12 pages.
"Japanese Application Serial No. 2023-104960, Voluntary Amendment Filed Jun. 29, 2023", with English translation, 61 pages.
"Indian Application Serial No. 202317039312, Voluntary Amendment Filed Jul. 7, 2023", with English claims, 17 pages.
"U.S. Appl. No. 18/355,858, Preliminary Amendment Filed Jul. 20, 2023", 6 pgs.
"U.S. Appl. No. 17/595,579, Response filed Aug. 28, 2023 to Non Final Office Action mailed May 26, 2023", 10 pgs.
"European Application Serial No. 20731715.7, Communication Pursuant to Article 94(3) EPC mailed Aug. 31, 2023", 8 pgs.
"Canadian Application Serial No. 3,138,776, Examiners Rule 86(2) Report mailed Oct. 30, 2023", 5 pgs.
"Korean Application Serial No. 10-2021-7037875, Response filed Nov. 15, 2023 to Notice of Preliminary Rejection mailed May 15, 2023", with English claims, 29 pages.
"Chinese Application Serial No. 202080038055.5, Office Action mailed Oct. 28, 2023", with English translation, 18 pages.
"U.S. Appl. No. 17/595,579, Final Office Action mailed Dec. 4, 2023", 12 pgs.
"European Application Serial No. 23195891.9, Extended European Search Report mailed Dec. 13, 2023", 9 pgs.
"U.S. Appl. No. 17/595,579, Response filed Feb. 5, 2024 to Final Office Action mailed Dec. 4, 2023", 10 pgs.
"European Application Serial No. 20731715.7, Response Filed Dec. 21, 2023 to Communication Pursuant to Article 94(3) EPC mailed Aug. 31, 2023", 9 pgs.
"European Application Serial No. 21814727.0, Response Filed Dec. 19, 2023 to Communication pursuant to Rules 161 and 162 mailed Jun. 21, 2023", 14 pgs.
"U.S. Appl. No. 17/595,579, Advisory Action mailed Feb. 28, 2024", 3 pgs.
"U.S. Appl. No. 17/595,579, Response filed Mar. 4, 2024 to Advisory Action mailed Feb. 28, 2024", 10 pgs.
"European Application Serial No. 20731715.7, Communication Pursuant to Article 94(3) EPC mailed Mar. 7, 2024", 9 pgs.
"Chinese Application Serial No. 202080038055.5, Response filed Mar. 12, 2024 to Office Action mailed Oct. 28, 2023", with English claims, 16 pages.
"Australian Application Serial No. 2021380017, First Examination Report mailed Mar. 5, 2024", 3 pgs.
"U.S. Appl. No. 17/595,579, Non Final Office Action mailed Apr. 9, 2024", 12 pgs.
"Japanese Application Serial No. 2023-026227, Notification of Reasons for Refusal mailed Apr. 2, 2024", with English translation, 10 pages.
"Canadian Application Serial No. 3,138,776, Response Filed Feb. 29, 2024 to Examiners Rule 86(2) Report mailed Oct. 30, 2023", 15 pgs.
GENETEC, "Synergis Cloud Link CSPN Security Target Version 1.1", with machine English translation, (Aug. 16, 2018), 99 pages.
Gunnebo, "CSPN Security Target for Gunnebo Product SMI—CSPN Version 01-02 SMI Solution Identification Authentication for Physical Access Control", with machine English translation, (Jun. 2017), 71 pages.
Nedap, "CSPN Security Target—Physical Access Management—Transparent Drive", with machine English translation, (Feb. 26, 2013), 79 pages.
"Japanese Application Serial No. 2023-104960, Notification of Reasons for Refusal mailed Jun. 18, 2024", with English translation, 16 pages.
"Australian Application Serial No. 2023219930, First Examination Report mailed Jun. 18, 2024", 2 pgs.
"Japanese Application Serial No. 2023-528465, Notification of Reasons for Refusal mailed Jun. 25, 2024", with machine English translation, 8 pages.
"European Application Serial No. 23195891.9, Response filed Jul. 8, 2024 to Extended European Search Report mailed Dec. 13, 2023", 40 pgs.
"Application Serial No. 17 595,579, Response filed Jul. 9, 2024 to Non Final Office Action mailed Apr. 9, 2024", 10 pgs.
"European Application Serial No. 20731715.7, Response filed Jul. 8, 2024 to Communication Pursuant to Article 94(3) EPC mailed Mar. 7, 2024", 26 pgs.
"Japanese Application Serial No. 2023-026227, Response Filed Jul. 1, 2024 to Notification of Reasons for Refusal mailed Apr. 2, 2024", with English claims, 6 pages.
"Mexican Application Serial No. MX a 2021-014188, Voluntary Amendment filed Apr. 16, 2024", with English claims, 17 pages.
"Japanese Application Serial No. 2023-104960, Response Filed Sep. 11, 2024 to Notification of Reasons for Refusal mailed Jun. 18, 2024", with English claims, 11 pages.
"Australian Application Serial No. 2021380017, Response Filed Sep. 19, 2024 to First Examination Report mailed Mar. 5, 2024", 55 pgs.
"Japanese Application Serial No. 2023-528465, Response Filed Sep. 13, 2024 to Notification of Reasons for Refusal mailed Jun. 25, 2024", with English claims, 12 pages.
"European Application Serial No. 21814727.0, Communication Pursuant to Article 94(3) EPC mailed Oct. 8, 2024", 5 pgs.
"Canadian Application Serial No. 3,198,185, Examiners Rule 86(2) Report mailed Nov. 1, 2024", 3 pgs.
"U.S. Appl. No. 17/595,579, Notice of Allowance mailed Nov. 8, 2024", 8 pgs.
"U.S. Appl. No. 17/595,579, Supplemental Notice of Allowability mailed Nov. 15, 2024", 2 pgs.

(56) References Cited

OTHER PUBLICATIONS

"European Application Serial No. 23195891.9, Communication Pursuant to Article 94(3) EPC mailed Dec. 13, 2024", 5 pgs.
"International Application Serial No. PCT US2020 033768, International Search Report mailed Sep. 10, 2020", 6 pages.
"Chinese Application Serial No. 202410945425.3, Voluntary Amendment filed Dec. 11, 2024", with English claims, 32 pages.
"Indian Application Serial No. 202117053266, Hearing Notice mailed Dec. 31, 2024", with English translation, 3 pages.
"Australian Application Serial No. 2023219930, Response filed Dec. 17, 2024 to First Examination Report mailed Jun. 18, 2024", 1 pg.
"Indian Application Serial No. 202117053266, Response filed Jan. 30, 2025 to Hearing Notice mailed Dec. 31, 2024", with English claims, 59 pages.
"European Application Serial No. 21814727.0, Response filed Feb. 7, 2025 to Communication Pursuant to Article 94(3) EPC mailed Oct. 8, 2024", 16 pgs.
"Japanese Application Serial No. 2025-010192, Voluntary Amendment filed Feb. 13, 2025", with English claims, 18 pages.
"U.S. Appl. No. 18/301,427, Non Final Office Action mailed May 12, 2025", 15 pgs.
"Canadian Application Serial No. 3,198,185, Response filed Feb. 26, 2025 to Examiners Rule 86(2) Report mailed Nov. 1, 2024", 9 pgs.
"European Application Serial No. 25151307.3, Extended European Search Report mailed Apr. 4, 2025", 17 pgs.
"U.S. Appl. No. 18/355,858, Corrected Notice of Allowability mailed Aug. 19, 2025", 2 pgs.
"U.S. Appl. No. 18/301,427, Response filed Aug. 13, 2025 to Non Final Office Action mailed May 12, 2025", 12 pgs.
"U.S. Appl. No. 18/355,858, Notice of Allowance mailed Aug. 12, 2025", 11 pgs.
"European Application Serial No. 23195891.9, Response Filed Jun. 11, 2025 to Communication Pursuant to Article 94(3) EPC mailed Dec. 13, 2024", 14 pgs.
"Canadian Application Serial No. 3,198,185, Examiners Rule 86(2) Report mailed Jul. 14, 2025", 6 pgs.
"Chinese Application Serial No. 202180076798.6, Office Action mailed Jul. 24, 2025", with English translation, 19 pages.
"European Application Serial No. 25151307.3, Response Filed Sep. 22, 2025 to Extended European Search Report mailed Apr. 4, 2025", 71 pgs.
"Korean Application Serial No. 10-2023-7019855, Notice of Preliminary Rejection mailed Oct. 15, 2025", with English translation, 9 pages.
"Japanese Application Serial No. 2024-140954, Notification of Reasons for Refusal mailed Oct. 28, 2025", with English translation, 10 pages.
"Canadian Application Serial No. 3,198,185, Response filed Nov. 13, 2025 to Examiners Rule 862 Report mailed Jul. 14, 2025", 12 pages.
"U.S. Appl. No. 18/301,427, Examiner Interview Summary mailed Nov. 20, 2025", 2 pgs.
"Chinese Application Serial No. 202180076798.6, Office Action mailed Jan. 5, 2026", with English translation, 14 pages.
"Korean Application Serial No. 10-2023-7020080, Notice of Preliminary Rejection mailed Feb. 2, 2026", with English translation, 9 pages.
"U.S. Appl. No. 18/301,427, Final Office Action mailed Mar. 6, 2026", 18 pgs.
"Korean Application Serial No. 10-2023-7019855, Response filed Feb. 19, 2026 to Notice of Preliminary Rejection mailed Oct. 15, 2025", with English claims, 19 pages.
"Mexican Application Serial No. MX a 2023 005606, Office Action mailed Feb. 11, 2026", with manual English translation, 16 pages.
"Australian Application Serial No. 2025200540, First Examination Report mailed Mar. 25, 2026", 2 pgs.
"Korean Application Serial No. 10-2024-7021615, Notice of Preliminary Rejection mailed Mar. 5, 2026", with English translation, 18 pages.
"Canadian Application Serial No. 3,198,185, Office Action mailed Apr. 2, 2026", 4 pgs.
"Canadian Application Serial No. 3,266,657, Office Action mailed Apr. 2, 2026", 5 pgs.
"Chinese Application Serial No. 202180076798.6, Decision of Rejection mailed Mar. 30, 2026", with English translation, 15 pages.
"Indian Application Serial No. 202317039312, First Examination Report mailed Apr. 23, 2026", with English translation, 9 pages.
"U.S. Appl. No. 18/301,427, Advisory Action mailed May 11, 2026", 2 pgs.
"U.S. Appl. No. 18/301,427, Response filed May 5, 2026 to Final Office Action mailed Mar. 6, 2026", 14 pgs.
"Mexican Application Serial No. MX a 2021 014188, Office Action mailed Apr. 9, 2026", with manual English translation, 8 pages.
"Chinese Application Serial No. 202180076798.6, Request for Reexamination filed Jun. 30, 2026", w English Claims, 13 pgs.
"Australian Application Serial No. 2025200540, Response filed Jun. 23, 2026 to First Examination Report mailed Mar. 25, 2026", 48 pgs.
"Mexican Application Serial No. MX a 2023 005606, Office Action mailed Apr. 17, 2026", with manual English translation, 14 pages.
"Australian Application Serial No. 2025202560, First Examination Report mailed May 14, 2026", 3 pgs.
"Australian Application Serial No. 2025202562, First Examination Report mailed May 20, 2026", 4 pgs.

* cited by examiner

500

| OPTIONS | DATA | CRC |
|---|---|---|
| 1 BYTE | 32 BYTES | 4 BYTES |

FIG. 5A

510

| BIT 7 | BITS 6...1 | BIT 0 |
|---|---|---|
| ERROR INDICATOR | RFU | TOGGLING BIT |

FIG. 5B

520

| CRC |
|---|

FIG. 5C

SECURE ELEMENT ARRAYS IN INTERNET-OF-THINGS SYSTEMS

PRIORITY APPLICATION(S)

This application is a national stage application under 35 U.S.C. § 371 of PCT Appl. No. PCT/EP2021/081512, titled "Secure Element Arrays in Internet-of-Things Systems," filed Nov. 12, 2021, which claims priority to U.S. Prov. Patent Appl. No. 63/113,423, filed Nov. 13, 2020, each of which is incorporated herein in its entirety by reference.

TECHNICAL FIELD

This document pertains generally, but not by way of limitation, to internet of things (IoT) systems, and particularly but not by way of limitation to transparent architecture for IoT systems.

BACKGROUND

Internet-of-things (IoT) systems often include edge devices that include various sensors or other methods of collecting and communicating data. Some of these edge devices may not have direct network connections or may otherwise be resource constrained. Additionally, there is often a requirement that these edge devices store key material and perform secure processing. However, edge devices in IoT systems often lack processing resources and security capabilities, and the physical locations of the edge devices may also make it inadvisable for the edge device to store key material. Also, these edge devices may implement software that requires regular updates. Due to the limited network connections for some of these edge devices, this may require a technician to visit each individual edge device each time a software update is needed. This can be time and resource consuming in systems with many edge devices.

SUMMARY OF INVENTION

The present invention provides a system and method for providing secure execution of system functions for edge devices, a non-transitory computer readable medium and a physical access control system as defined in the claims.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5A-5C are diagrams illustrating example transmission frames for a full-duplex protocol for use in a half-duplex system.

DETAILED DESCRIPTION

Figure 1:
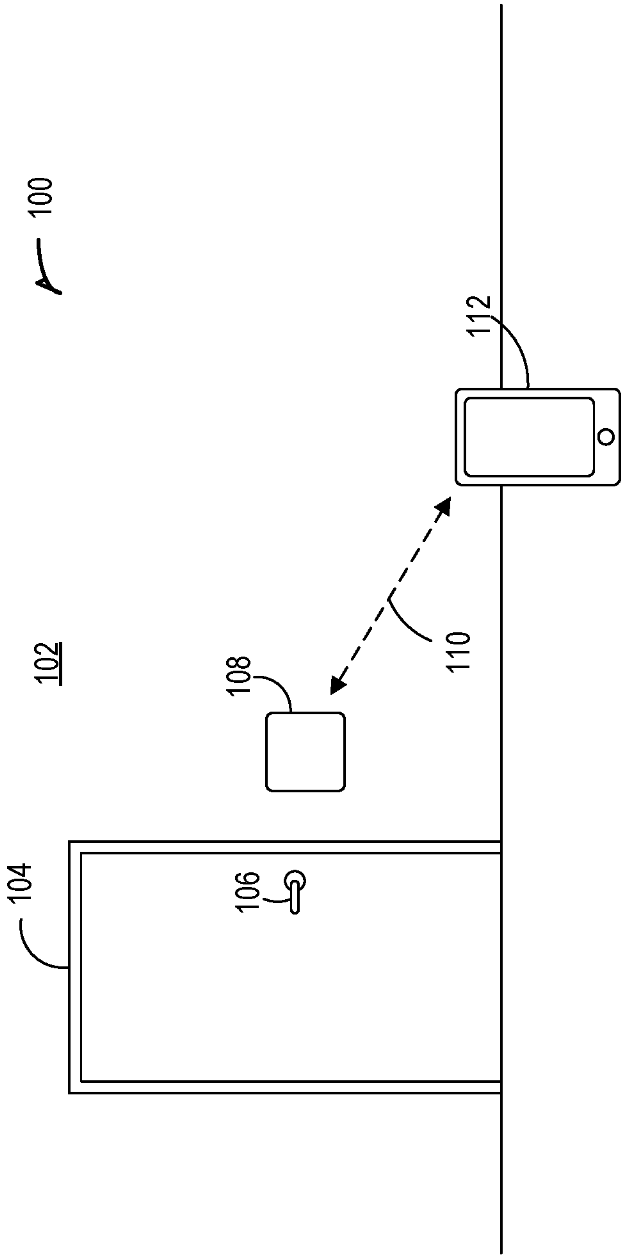
FIG. 1 is a diagram illustrating an example physical access control system.

Systems and methods are disclosed herein for implementing a transparent architecture for internet-of-things (IoT) systems using arrays of secure elements. An example IoT architecture includes a gateway that is equipped with a built-in or connectable array of secure elements. Secure elements include hardware and/or software for performing cryptographic functions or processes—e.g., encryption, decryption, signature generation, signature verification, and/or key generation. Secure elements are contained within an explicitly defined perimeter that establishes the physical bounds of the cryptographic module and that contains any processors and/or other hardware components that store and protect any software and firmware components of the cryptographic module. Secure elements could take the form of (or include) a secure crypto-processor, a smart card, a secure digital (SD) card, a micro SD card, a SIM card, and/or any other cryptographic module.

The secure element (SE) is a tamper-resistant platform capable of securely hosting applications and their confidential and cryptographic data in accordance with the rules and security requirements set forth by a set of well-identified trusted authorities. The SE can be considered to be a chip that offers a dynamic environment to store data securely, process data securely and perform communication with external entities securely.

Physical Access Control Systems (PACS) include readers (edge devices) and controllers (intermediary servers/devices). In conventional PACS systems, the readers are smart devices hosting and running software to securely communicate with cards or mobile phones that come within communication range of the reader. Successful PACS systems focus on both user experience and security. Hence, the reader devices must have enough processing power to deal with latency issues as well as both hardware and software-based security primitives. The reader devices have support to authenticate and read data from a wide range of card devices that have different protocols (at both transport and application level) and have different data modalities. This results in a lot of software implemented by the reader devices that must be updated to support new card modalities, bug fixes, and the like. Because reader devices often do not have network connections, the reader device must be physically visited by a technician to perform these updates. Further, this results in secure elements physically located on the reader that store secure software and key material. Some readers are physically located on the external portions of a building, for example, which can raise security concerns for companies, certification entities, or other users of a PACS system that want or need all secure storage of key materially to be physically located within a secure perimeter, such as the perimeter of a building.

To remedy the above situations, an array of secure elements remote from the reader may be used to execute the security and application software for the reader devices. The array of secure elements may be integrated with, or attached to, the PACS controller and configured to handle multiple parallel requests and connections to the edge devices (readers). The PACS controller may have a network connection to one or more remote devices which may store and provide software or firmware updates for the secure elements. This way, the secure elements can be updated without the need for a technician to visit each individual edge device (reader). The PACS controller may also be physically located within a building or other secure perimeter, eliminating security concerns of having secure elements located on some readers.

In one example, the array of secure elements may be positioned on a sister board that can be connected to a host device using one or more busses having bus protocols such as serial peripheral interface (SPI), inter-integrated circuit (I2C), universal serial bus (USB), and the like. Secure elements may be used for several functions. For example, the secure element may act as a cryptographic processor, providing security algorithms and secure storage of sensitive key material. In other examples, the secure elements may be used as an application platform executing application specific software along with the security algorithms and storage of key material. For example, in a PACS system, the secure elements may be used to perform authentication for users that present a credential at a PACS reader. This way, the software functions for performing user authentication are not needed on the reader device itself.

FIG. 1 depicts an example scenario 100 in which a PACS could be used. As shown in FIG. 1, a wall 102 has disposed therein a door 104. In an example situation, a secured area lies behind the door 104, which has a lockable handle 106 that grants access to the secured area when in an unlocked state and prevents access to the secured area when in a locked state.

A reader device 108 is positioned proximate to the handle 106 of the door 104. In an example, the handle 106 is locked in the default state. The reader system 108 is operable to selectively place the handle 106 in an unlocked state responsive to being presented with an authorized credential contained in a credential device 112, which can communicate with the reader device 108 via a wireless interface 110. In various examples, the credential device 112 could be a keycard, a fob, a mobile device (e.g., a smart phone), or any other suitable credential device having the communication capabilities and credentials.

In conventional systems, the application software to authenticate the user may be implemented on the reader device 108 itself. For example, the user presents the credential device 112 which communicates with the reader device 108 to provide a credential to the reader device 108. The reader device 108 then uses the received credential to securely authenticate the user and unlock the handle 106. In other conventional examples, some of this function is included on the reader device 108 and some is included on a remotely located PACS controller. For example, the reader device may perform a secure transaction with the credential device 112 and then transmit data to the PACS controller to authenticate the user. The controller may then communicate to unlock the handle 106.

Because the reader device 108 performs secure transactions and/or authentication, software or firmware updates may be required for the reader device 108. In some examples, the reader device 108 does not include a network connection and is only connected to the PACS controller through a single wired connection such as an RS-485 or other connection. This requires a technician to physically travel to the reader device 108 to update software or firmware for each reader device 108 in a PACS system. It is desirable to move some of this functionality away from the reader to provide ease of maintenance while also providing the user with the same or better user experience at the reader device 108.

To accomplish this, an array of secure elements may be implemented at the PACS controller, each configured to perform secure software execution for respective reader devices 108. These PACS controllers often include one or more network connections, allowing remote updating of software executed by the secure elements, removing the need for technicians to physically travel to each reader device 108. It should be understood that the present disclosure is applicable to numerous types of IoT systems in addition to PACS systems. The system 100 illustrated in FIG. 1 is presented purely by way of example and not limitation.

Figure 2:
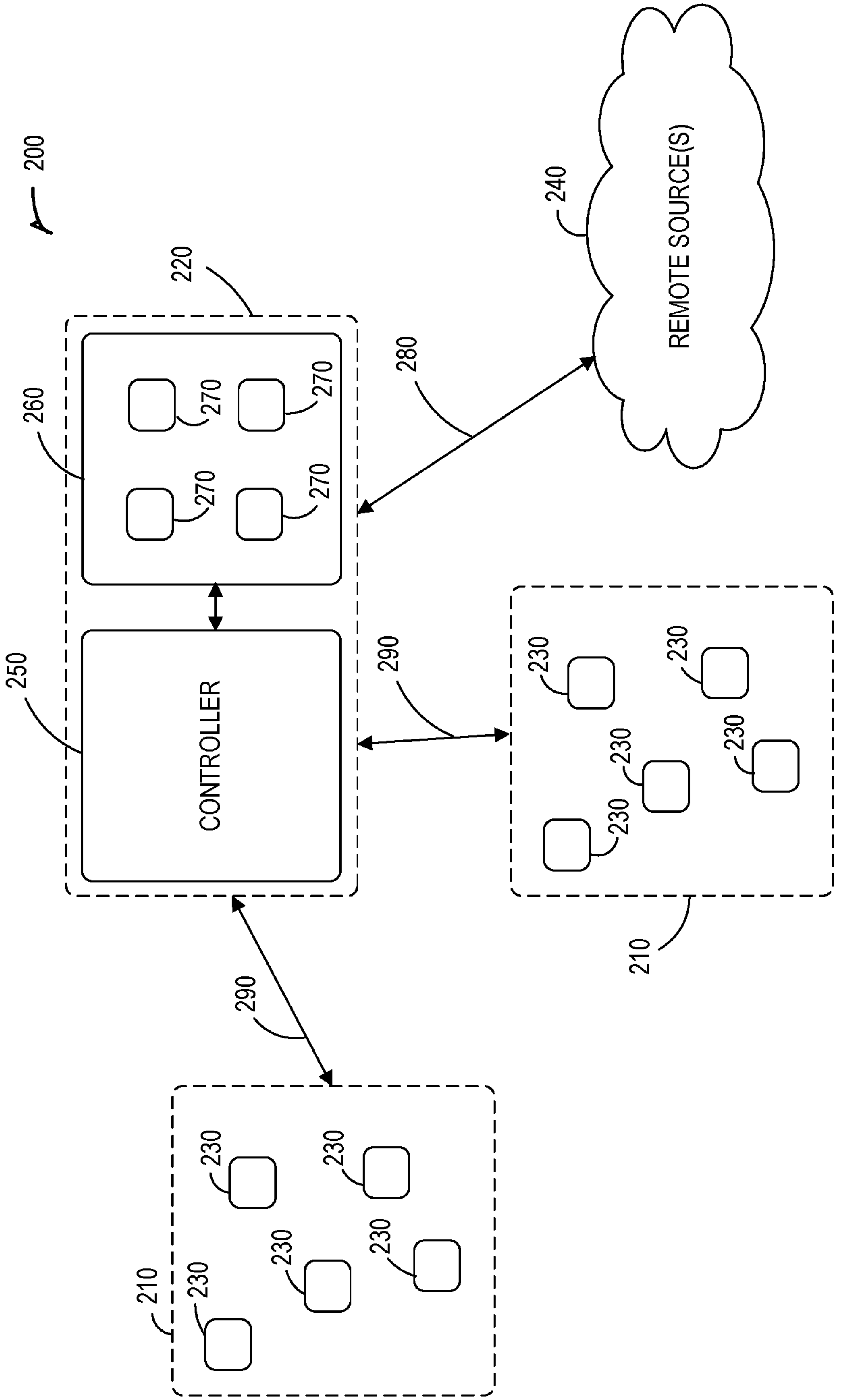
FIG. 2 is a block diagram illustrating an example internet-of-things (IoT) architecture that includes an array of secure elements.

FIG. 2 is a diagram illustrating an IoT system 200. System 200 includes edge device clusters 210 and a secure IoT gateway (SIG) 220. The edge device clusters 210 may each include one or more edge devices 230, such as the reader device 108 of FIG. 1. The SIG 220 may communicate with a remote source 240 via a local area network or wide area network 280, such as the Internet. The SIG 220 may include a controller 250 and a sister board 260 that includes secure elements 270. In an example, the controller 250 may be a PACS controller. While illustrated as two clusters 210 each of five edge devices 230, and four secure elements 270, any number of clusters 210 having any number of edge devices 230, and any number of secure elements 270 may be implemented for the system 200. While illustrated as a separate controller 250 and sister board 260, in some examples the secure elements 270 may be integrated with the controller 250. The controller 250 may be connected to communicate with the sister board 260 using any bus protocol such as SPI, I2C, USB, and the like.

The SIG 220 is connected through a network connection 280 to communicate with the remote source(s) 240 and is connected through individual connections 290 to communicate with respective edge devices 230. For example, the connection 280 may be a local or wide area network connection, such as an Internet connection. The individual connections 290 may be wired or wireless connections such as Ethernet, Wi-Fi, USB, RS-485, or the like. While illustrated as a single connection 290 for each cluster 210, there may be a connection 290 for each individual edge device 230. The remote source 240 may be one or more servers or other computing devices and may store a firmware file or other software update for secure elements 270. In some examples, the SIG 220 communicates with the remote source 240 to obtain the firmware file or other software update and to update the one or more secure elements 270 implemented by the SIG 220.

In a PACS system, such as the one illustrated in FIG. 1, the reader device 108 may be an edge device 230 connected to communicate with a controller 250 such as a PACS controller. The connection 290 may be a wired full-duplex connection, wired half-duplex connection such as an RS-485 connection, or any other connection. The secure elements 270 may be configured to execute software to perform functions using application specific hardware, for the reader 108. For example, when a user approaches the reader device 108 and presents a credential using a credential device 112, a secure element 270 may be allocated to the transaction to perform security algorithms and secure storage of sensitive key material, as well as user authentication. In some examples, the reader device 108 may only obtain the credential information from the credential device 112, provide the credential information to the controller, and a secure element 270 performs all of the application specific functions for authenticating the user and unlocking the door handle 106. In other examples, some of the application specific functions may be executed by the reader device 108 and some may be executed by a secure element 270.

When a user approaches the reader device 108, or when the reader device 108 receives a user credential, the controller 250 or other electronic circuit may select and allocate a secure element 270 for use with the reader device 108. This may be any secure element 270 that is currently available for execution of software for the reader device 108.

In an example, each edge device 230 may dynamically receive reference to a secure element 270 that the respective edge device 230 is assigned to for a respective session. For example, when an edge device 230 needs a secure element 270, the controller 250 may identify an available secure element 270 that is able to provide the necessary functions for the respective edge device 230. The controller 250 may also be implemented as a "dispatcher", becoming responsible for dispatching messages or data to a respective secure element 270, shielding the secure element array from respective edge devices 230. This enables a high level of modularity in code development and management, as well as protects against the crash or termination of an edge device 230 or other actor within the system.

Other devices or circuits may be also implemented within the system 200 to monitor the lifecycle of edge devices 230 or secure elements 270 and implement a policy to either respawn respective devices or keep the devices terminated and inform a system administrator, for example. In other examples, one or more of the edge devices 230, the controller 250, or secure elements 270 may monitor the life cycle of devices in the system, which can be used in cleaning up or resetting respective states of devices within the system.

In some cases, it may be desirable to implement applications and key material for edge devices that is not accessible by the remote devices 240 or other entities. For example, in a PACS system, an entity may wish to program the controller 250 or secure elements 270 with specific authentication code that is not accessible by any other entities such as through the remote devices 240. To facilitate this, the secure elements 270 may be configured such that the secure elements 270 are programmable in high level languages. In some examples, even though the secure elements 270 are resource constrained devices, a runtime may be implemented that is capable of running a language runtime for the secure elements 270. Thus, an entity can develop an application and install the application on the secure elements 270.

In the above scenario, it is desirable to limit who can install these applications on the secure elements 270. In an example, an application to be installed in the secure elements 270 must be signed by the entity and then a higher level or other entity doubly signs the application with corresponding keys. If the application is doubly signed, one or more of the secure elements 270 or a built-in secure element of the controller 250 allows the application to be installed on a respective secure elements 270. This enables entities to independently develop applications and load them in the secure elements 270. In some examples, a virtual firewall may also be implemented by the secure elements 270 to prevent applications installed by the secure elements 270 from interfering with each other.

Figure 3:
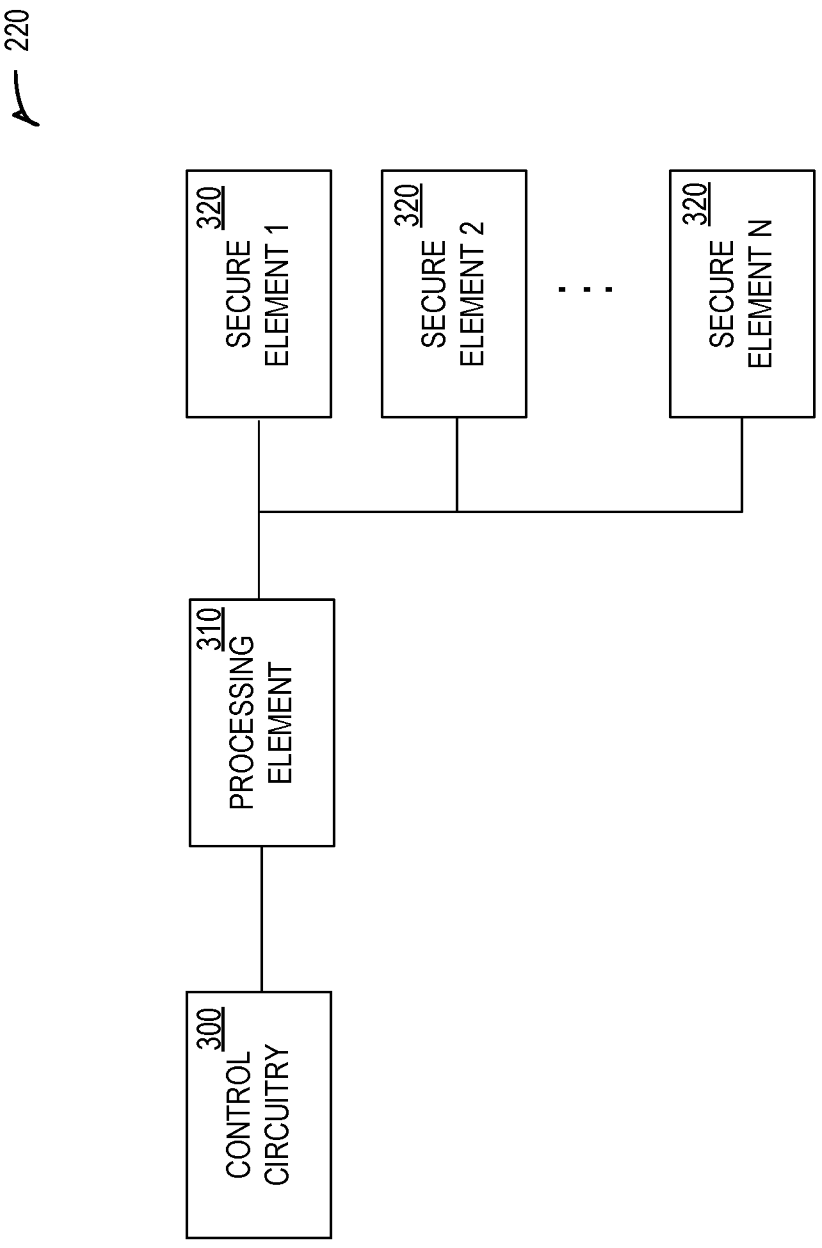
FIG. 3 is a block diagram illustrating an example secure IoT gateway.

FIG. 3 is a block diagram illustrating an example implementation of the SIG 220. The gateway 220 includes control circuitry 300, a processing element 310, and one or more secure elements 320, which may be the secure elements 270 of FIG. 2. In some cases, the gateway 220 includes four secure elements 320. Each secure element 320 of gateway 220 may be configured to perform a same function. In some implementations, secure elements 320 are implemented (both in hardware and software) to provide a higher level of security assurance than typical general-purpose microprocessors. In some implementations, secure elements 320 are implemented as general-purpose microprocessors without providing higher level of security assurance.

The control circuitry 300 and processing element 310 may be configured to implement an allocation protocol for assigning a secure element 320 to a respective edge device 230. The control circuitry 300 and processing element 310 may be implemented by the controller 250 and/or on the sister board 260. To facilitate use of the secure elements 320 with the edge devices 230, the edge devices 230, secure elements 320, protocols, and the like may be implemented as actors that manage their own state and only communicate with other actors in the system using in-process messaging. These actors maintain the configuration state of the respective device of the actor and also dynamically receive references to the secure element 320 the actor is assigned for a given session. Similarly, the actors may get attached/registered with an actor capable of communicating using a desired transport and application protocol.

The control circuitry 300 and/or the processing element 310 may execute software that acts as a dispatcher actor that becomes responsible for dispatching the messages/data to the relevant and appropriate secure element 320 thereby shielding the whole array of secure elements 320 from the actors that represent the edge devices 230, for example. Use of actors and in-process messaging enables a high level of modularity in code development and maintenance, excellent performance due to zero overhead in interaction between components since they are all part of same process, as well as protection from any component malfunctioning. Typically, a fault or bug in a software component of a process leads to crash of the entire process. The actor model enables the system to contain faults within individual actors and thereby shield the process from the fault. This mechanism ends up providing almost 100% uptime and resiliency from ill behaving components/actors in the process.

The remote source 240 may provide updates for the secure elements 320 through the network connection 280. For example, the firmware of the first secure element 320 may be updated via a security enclave, such as a trusted execution environment, implemented by the processing element 310. In such cases, the security enclave may run applications that make use of crypto support and offer isolation from the general computing environment. In some implementations, the security enclave implemented by the processing element 310 includes symmetric or asymmetric key material that is used by the security enclave to communicate with another device. The cryptographic process and technique used by the security enclave to communicate with devices is different from the cryptographic process implemented by the secure elements of the gateway 220.

The number of secure elements 320 may be less than the number of edge devices 230 served by the secure elements 320. This may be advantageous when not all edge devices 230 are expected to be active contemporaneously. Further, this facilitates the ability to interleave requests to one secure element. In some examples, one secure element actor may be associated with two edge device actors. Even if the two edge device actors are active at the same time, the two edge device actors may be at different stages of communication. The requests from each edge device actor may be interleaved to the single secure element actor. For example, a transaction may include several command-response pairs between an edge device and a secure element. By the time a secure element returns the response to certain command from the first edge device, the controller could receive the different command from the second edge device. In this situation, interleaving the communication from the two edge devices facilitates efficient usage of a single secure element.

In examples in which the secure elements 320 are positioned on a sister board physically separable from the controller 250, it is desirable to authenticate the sister board when plugging in or otherwise connecting the sister board to the controller 250. To accomplish this, the controller 250 may include an additional secure element built-in to the controller 250 and having the capability to both authenticate the array of secure elements 320 and verify policy compatibility with a respective controller 250. In another embodiment, rather than including a built-in secure element on the controller 250, the secure enclave provided by microprocessors can be used.

Figure 4A:
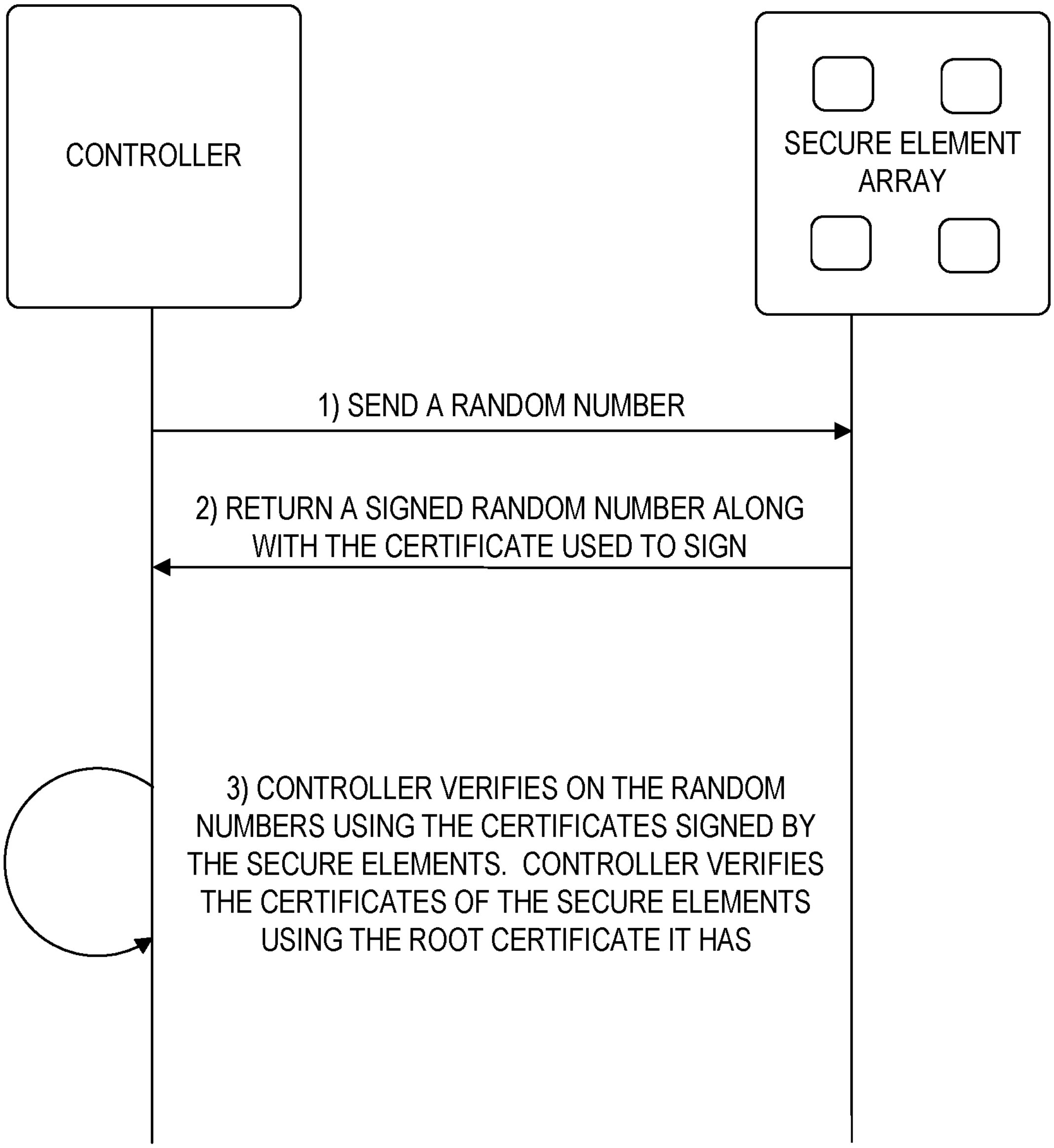
FIG. 4A illustrates an example workflow for authenticating an array of secure elements by a controller.

FIG. 4A illustrates an example workflow for authenticating an array of secure elements 320 by a controller 250. In one example, the enclave or built-in secure element of the controller 250 contains an asymmetric key pair along with a signed root digital certificate. Having a signed digital certificate enables the enclave or built-in secure element in the controller 250 to send a random number to secure array of secure elements. The secure elements 320 in the array then return the signed random numbers along with the certificates that were used by the secure elements 320. Note that each secure element in the array has different certificates and keys, but all of the certificates have the same parent (root) certificate. The enclave or built-in secure element in the controller 250 then verifies the signature on the random number and verifies the certificates of the secure elements 320. This process, which is similar to public key infrastructure (PKI), can be used by the controller 250 to authenticate the secure elements 320. This process may be performed when the sister board is connected to the controller, and then again, or alternatively, at random intervals to protect against vulnerabilities that arise due to man-in-the-middle attacks, for example.

Figure 4B:
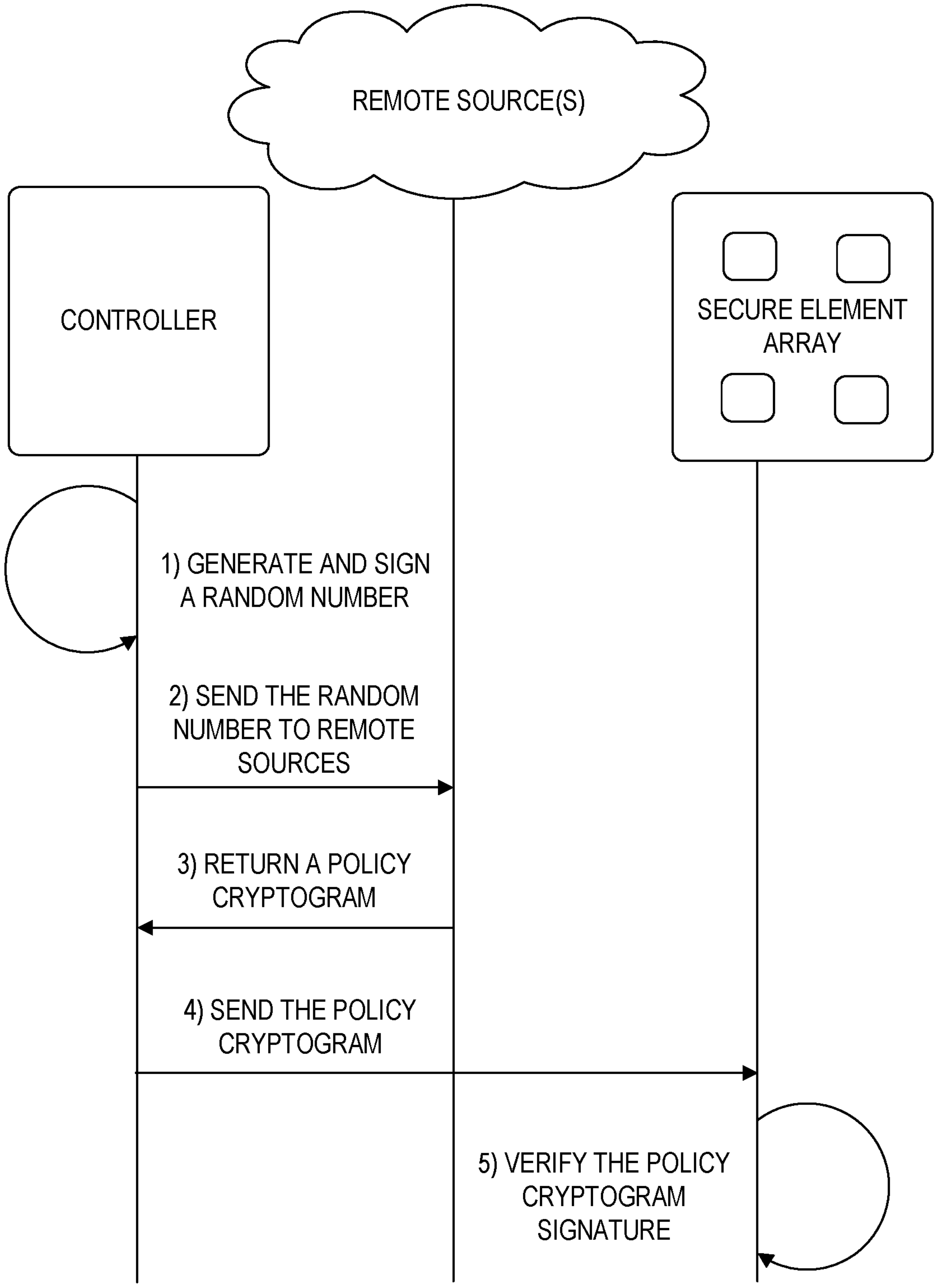
FIG. 4B illustrates an example workflow for authenticating a policy and/or controller by a sister board of secure elements.

The above process only verifies the authenticity of the sister board, but it may also be desirable for the sister board to authenticate the controller 250 and/or the system policies. FIG. 4B illustrates an example workflow for authenticating a policy and/or controller 250 by a sister board of secure elements 320. The policy may be authenticated with the help of the one or more remote devices 240. The enclave or built-in secure element in the controller 250 can authenticate with the remote devices 240 and obtain a signed cryptogram specific to the controller 250 in question. This signed cryptogram is then sent to the array of secure elements 320 in the sister board. Only if the signature is correct then the secure elements 320 will function. In some examples, the secure elements may also include the capability of parsing the policy and only providing a subset of the functionality to the controller 250 based on the parsed policy.

Some PACS systems are connected using full-duplex connections to communicate between readers and the PACS controllers. However, for some conventional systems, communication between the secure elements 320 and the edge devices 230 use half-duplex connections 290. In these systems, to ensure a desirable user experience, it is desirable to implement a full-duplex communication protocol for legacy half-duplex connections. For example, some conventional PACS systems may include RS-485 connections for the connections 290. In these conventional systems, one of the reader or controller acts as the primary communicator and the other acts as a secondary communicator. To facilitate communication between the edge devices 230 and the secure elements 320, a full-duplex protocol may be implemented for the half-duplex connections such that all devices can act as primary communicators.

The full-duplex protocol may be designed so that the protocol can be used on generic universal asynchronous receiver-transmitter (UART) hardware present in modern microcontrollers without a need for hardware modifications to existing devices. Together with resolving data collisions, the protocol helps with mitigating data corruption that might occur because of noisy or otherwise poor RS-485 lines. The protocol is intended to be used in combination with higher-level protocols without posing major limitations on them. In an open systems interconnection (OSI) model, the protocol can be implemented at the data-link layer. All data sent by the sender is acknowledged by the receiver. If a proper acknowledgment is not received by the sender in due time, the protocol incorporates a collision resolution algorithm that results in successful data delivery as described with respect to FIG. 6.

Figures 5A, 5B, 5C:
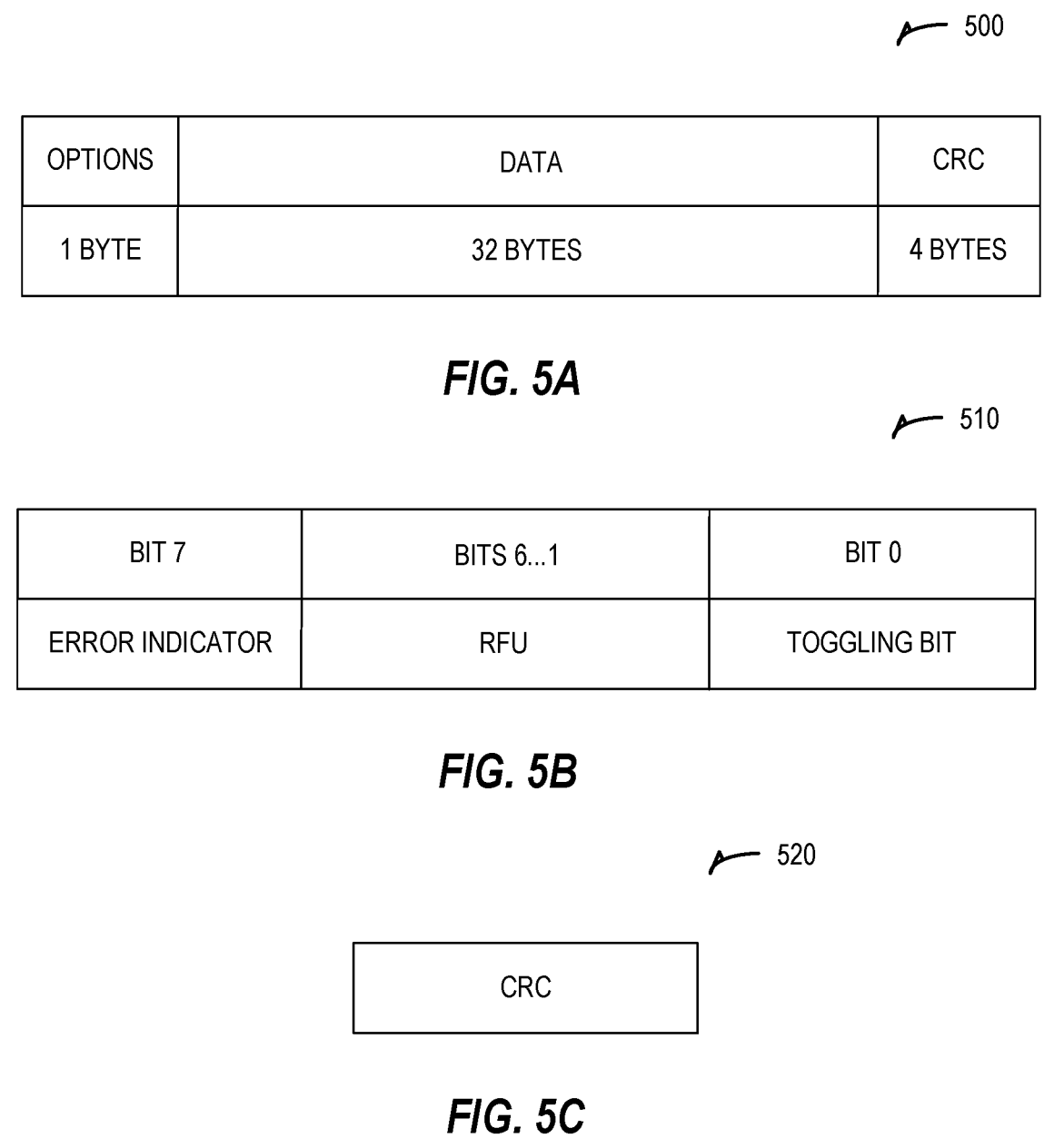

FIGS. 5A-5C are diagrams illustrating example data frame formats for a full-duplex protocol for use in a half-duplex system. FIG. 5A illustrates a data frame 500 used to communicate data over the half-duplex connections. The data frame 500 is illustrated as including 37 bytes but may include any number of bytes. The data frame 500 includes an options byte (FIG. 5B), a data payload, and a four-byte cyclic redundancy check (CRC). While illustrated as 32 bytes, the data frame 500 may be configured to have a data payload of any size. The CRC may be used to detect errors in transmission of the data in the data frame 500.

FIG. 5B illustrates an example options field 510 for a data frame 500. The options field 510 includes an error indicator bit, 6 bits that are reserved for future use (RFU), and a toggle bit. The RFU bits may be allocated for any purpose. The error indictor is a single bit that indicates an error in the transmission protocol. If set to 0, the frame transfers data. If set to one, the frame indicates that a critical error has occurred on a device, such as an edge device 230, and the other device, such as the controller 250, should act accordingly. The error indication may be used in addition to error detection in higher level layers than the protocol is implemented. The toggle bit is used when sending data frames and is toggled every consecutive frame. The toggle bit is used to differentiate between two consecutive frames with the same data and retransmission of a single frame.

FIG. 5C illustrates an example acknowledgement frame 520 provided by a receiver when a data frame is successfully received from a sender. In this example, the acknowledgement frame includes a CRC field that is a copy of the CRC frame of the data frame 500. While illustrated as using the CRC for the acknowledgement frame 520, any data may be used for acknowledgement that allows the sender to verify with reasonable certainty that the data frame 500 was received by the recipient. For example, any bit pattern that both relates the acknowledgment to the data frame 500 and is large enough and random enough that the probability that random noise or a corrupted frame is identified as a valid acknowledgement is very small.

When implementing the communication protocol, two different roles may be statically assigned to the two devices, role "A" and role "B". For example, the controller 250 may be assigned the role "A" and the edge devices 230 may be assigned the role "B". The baud rate, number of stop bits used and bit order may be agreed between the devices in advance. An estimated time unit (ETU) value for the protocol may also be defined. The ETU value may generally be selected to be greater than the time required to transmit a data frame 500 and receive an acknowledgement frame 520 with some added margin. For example, for a baud rate of 115200 bits-per-second (bps), a value of 5 milliseconds may be used.

Figure 6:
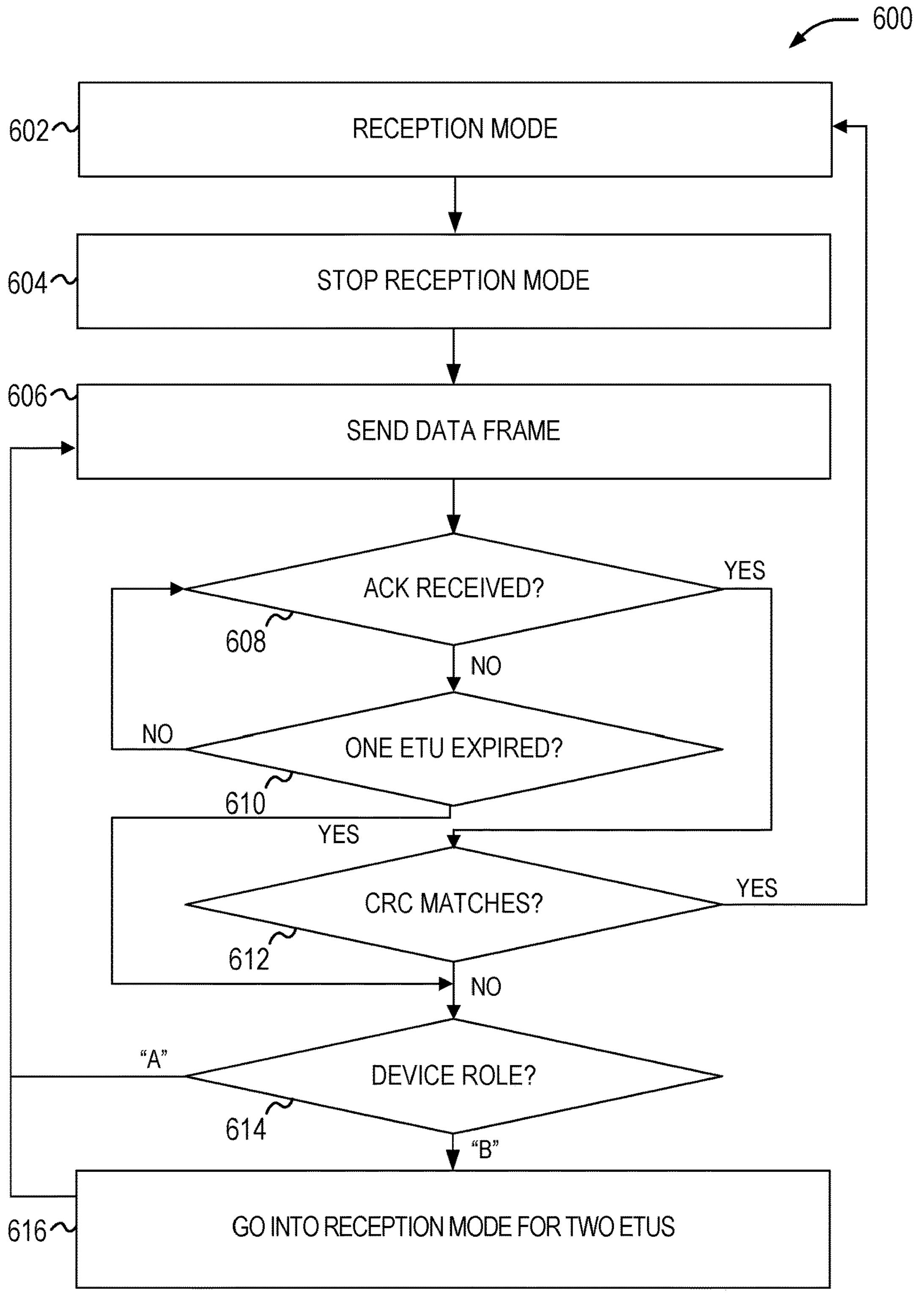
FIG. 6 is a flowchart illustrating an example method of transmitting messaging on a half-duplex communication line using a full-duplex protocol.

FIG. 6 is a flowchart illustrating a method 600 for transmitting data according to a full-duplex protocol on a half-duplex connection. When sending a data frame 500, a device must wait until the line is idle. Once the line is idle, the data frame is transmitted with the specified number of bytes. When receiving a frame, the specified number of bytes is received and then the device waits for the line to become idle. When idling, both nodes are in reception mode (step 602) and waiting to receive data. Once received, the CRC of the received data frame 500 is checked. If the CRC is incorrect, the node begins receiving another data frame. If the CRC is correct, the node transmits the corresponding acknowledgement and starts receiving another data frame. When a new data frame is received, it is checked if the CRC of the frame is equal to the CRC of the last received frame if there was one. In case they match, the frame is considered a duplicate and is not reported to higher layers. An acknowledgment is still sent for duplicate frames.

When sending a data frame 500, at step 604, the device stops the reception mode. At step 606, the data frame 500 is sent using the specified number of bytes. Following transmission of the data frame 500, the device waits until either an acknowledgement is received (step 608) or an ETU has expired (step 610). If an ETU has expired prior to receiving the acknowledgement, method 600 proceeds to step 614. If the acknowledgement is successfully received, method 600 proceeds to step 612 and checks the CRC of the acknowledgement frame 520. If the CRC does not match that of the transmitted data frame 500, the method 600 proceeds to step 614. If the CRC matches, the data frame 500 was successfully sent and the method returns to step 602 and the device re-enters reception mode. At step 614, the device role is checked. If the device is a role "A" device, the method 600 returns to step 606 and retransmits the data frame 500. If the device is a role "B" device, the device proceeds to step 616 and enters reception mode for two ETUs to minimize collisions on the line and then returns to step 606 to retransmit the data frame 500. Method 600 provides a full-duplex protocol that resolves collisions for use on a half-duplex line.

Figure 7:
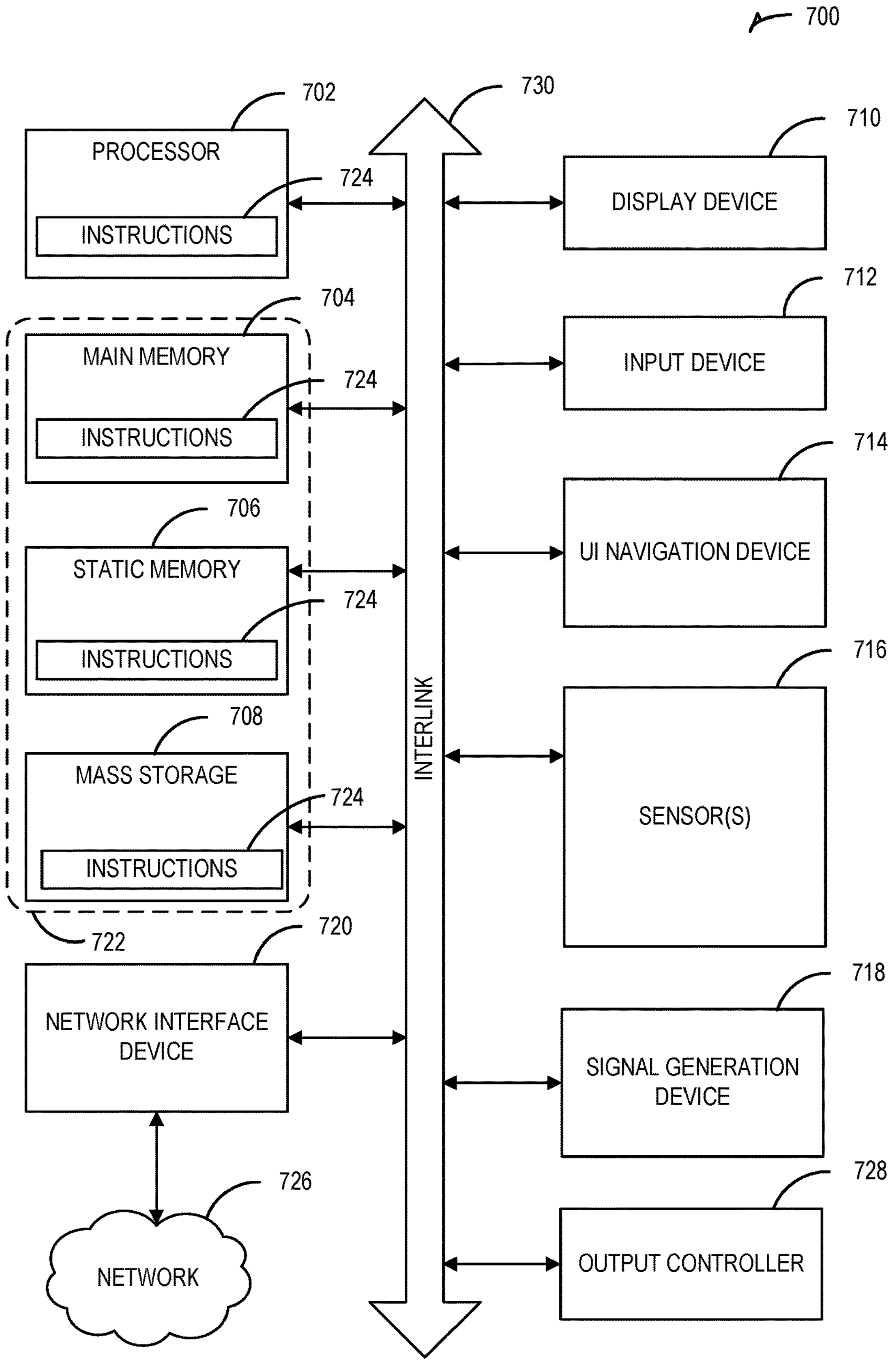
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. For example, the machine 700 can be any one or more of the edge devices 230, the controller 250, or the secure elements 270. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the term "or" is used to refer to a nonexclusive or, such that "A or B" includes "A but not B," "B but not A," and "A and B," unless otherwise indicated. The Abstract is provided to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations. The scope of the invention should be determined with reference to the appended aspects, along with the full scope of equivalents to which such aspects are entitled.

What is claimed is:

1. A system for providing secure execution of system functions for edge devices, the system comprising:

a controller configured to connect for communication with a plurality of edge devices, each edge device configured to obtain data for an application of the system, the controller further configured to receive the data from each of the plurality of edge devices; and an array of secure elements connectable to the controller, wherein the array of secure elements is configured to execute functions using the data received from the plurality of edge devices;

wherein the controller is further configured to:

authenticate the array of secure elements using at least one certificate returned by each of the secure elements of the array of secure elements in response to physical connection of the array of secure elements to the controller;

associate an identified authenticated secure element of the array of secure elements with a respective edge device of the plurality of edge devices after the array of secure elements is authenticated to execute the functions for data received from the respective edge device; and communicate a result of the executed functions to the respective edge device;

wherein a total number of the plurality of edge devices is greater than a total number of the secure elements, wherein the controller is configured to associate at least two of the plurality of edge devices with a single secure element of the array of secure elements, wherein the single secure element is configured to communicate with the at least two of the plurality of edge devices using command-response pairs and interleave the command-response pairs of the at least two of the plurality of edge devices during communication.

2. The system of claim 1, wherein the controller is configured to connect for communication to each of the plurality of edge devices through a connection comprising Ethernet, Wi-Fi, RS-485, or universal serial bus (USB).

3. The system of claim 1, wherein the plurality of secure elements are positioned on a sister board, and wherein the sister board physically connects to the controller and communicates with the controller via one or more bus protocols.

4. The system of claim 3, wherein the secure elements of the array of secure elements are configured to authenticate the controller by verifying a cryptographic signature of a policy cryptogram received from the controller via one or more remote sources that manage the policy.

5. The system of claim 1, wherein the secure elements are programmable to perform custom functions that is a subset of functionality of the secure elements, and wherein the secure elements of the array of secure elements are configured to verify authenticity of a policy received from a remote source and parse the policy to permit the installation and execution of only the custom functions.

6. The system of claim 1, wherein the array of secure elements is further configured to isolate at least one of the functions executed by the array of secure elements.

7. A method for providing secure execution of functions for a plurality of edge devices in an internet-of-things (IoT) system, the method comprising:

receiving, by a controller of the IoT system, data from a respective edge device of the plurality of edge devices of the IoT system;

authenticating, by the controller, an array of secure elements using at least one certificate returned by each of the secure elements of the array of secure elements in response to physical connection of the array of secure elements to the controller;

associating an identified authenticated secure element of the array of secure elements connected to the controller with the respective edge device after the array of secure elements is authenticated;

providing the received data to the identified secure element, wherein the secure element executes functions using the data; and communicating, via the controller, a result of the executed functions of the identified secure element to the respective edge device;

wherein a total number of the plurality of edge devices is greater than a total number of the secure elements, wherein the controller is configured to associate at least two of the plurality of edge devices with a single secure element of the array of secure elements, wherein the single secure element is configured to communicate with the at least two of the plurality of edge devices using command-response pairs and interleave the command-response pairs of the at least two of the plurality of edge devices during communication.

8. The method of claim 7, wherein the controller is connected to communicate with the respective edge device using an RS-485, Ethernet, Wi-Fi, or universal serial bus (USB) connection.

9. The method of claim 7, wherein the plurality of secure elements are positioned on a sister board, wherein the sister board physically connects to the controller and communicates with the controller via one or more bus protocols and wherein the controller authenticates the secure elements of the array of secure elements in response to connection of the sister board to the controller.

10. The method of claim 7, further comprising isolating at least one of the functions executed by the identified secure element from the other functions executed by the identified secure element.

11. A non-transitory computer readable medium comprising executable program code, that when executed by one or more processors of a controller of a physical access system, causes the one or more processors to:

authenticate to a remote device to receive a signed cryptogram;

authenticate to an array of secure elements by sending the signed cryptogram to the array of secure elements in response to physical connection of the controller and the secure elements;

receive data from a respective edge device of a plurality of edge devices of an IoT system;

associate an identified secure element of an array of secure elements with the respective edge device after the controller is authenticated by the array of secure elements;

provide the received data to the identified secure element, wherein the secure element executes functions using the data; and communicate a result of the executed functions of the identified secure element to the respective edge device;

wherein a total number of the plurality of edge devices is greater than a total number of the secure elements, wherein the executable program code further causes the one or more processors to associate at least two of the plurality of edge devices with a single secure element of the array of secure elements, wherein the single secure element is configured to communicate with the at least two of the plurality of edge devices using command-response pairs and interleave the command-response pairs of the at least two of the plurality of edge devices during communication.

12. A physical access control system comprising:

a controller configured to connect to each of a plurality of readers to receive credential information therefrom, each of the plurality of readers positioned to communicate with a credential device to receive respective credential information therefrom for controlling access to a respective secured area using the respective credential information; and an array of secure elements configured to execute user authentication using the credential information received from the plurality of readers;

wherein the controller is further configured to:

authenticate the array of secure elements using at least one certificate returned by each of the secure elements of the array of secure elements in response to physical connection of the array of secure elements to the controller;

associate an identified authenticated secure element of the array of secure elements with a respective reader of the plurality of readers after the array of secure elements is authenticated to perform user authentication using the credential information received from the respective reader; and communicate a result of the user authentication to the respective reader;

wherein a total number of the plurality of readers is greater than a total number of the secure elements, wherein the controller is configured to associate at least two of the plurality of readers with a single secure element of the array of secure elements, wherein the single secure element is configured to communicate with the at least two of the plurality of readers using command-response pairs and interleave the command-response pairs of the at least two of the plurality of readers during communication.

13. The physical access control system of claim 12, further comprising the plurality of readers.

14. The physical access control system of claim 12, wherein the controller is configured to connect for communication to each of the plurality of readers through a connection comprising Ethernet, Wi-Fi, RS-485, or universal serial bus (USB).

* * * * *